United States Patent [19]

Ivas et al.

[11] 3,812,524

[45] May 21, 1974

[54] PRESET CONTROL SYSTEM FOR A COLOR TELEVISION RECEIVER

[75] Inventors: Thomas W. Ivas, Evergreen Park; William H. Slavik, Palos Hills, both of Ill.

[73] Assignee: Motorola Inc., Franklin Park, Ill.

[22] Filed: Oct. 19, 1972

[21] Appl. No.: 299,063

Related U.S. Application Data

[62] Division of Ser. No. 140,489, May 5, 1971, abandoned.

[52] U.S. Cl. .......................................... 358/28

[51] Int. Cl. .......................................... H04n 9/12

[58] Field of Search ...... 178/5.4 R, 5.4 MC, 5.4 HE

[56] References Cited

UNITED STATES PATENTS

| | | | |
|---|---|---|---|
| 3,674,919 | 7/1972 | Garrett et al. | 178/5.4 HE |
| 3,617,621 | 1/1971 | Cochran | 178/5.4 HE |
| 3,619,487 | 11/1971 | Norley et al. | 178/5.4 HE |
| 3,654,384 | 4/1972 | Kresock et al. | 178/5.4 HE |
| 3,595,988 | 7/1971 | Kawamata et al. | 178/5.4 MC |
| 3,648,179 | 3/1972 | Ikegami et al. | 178/5.4 MC |

*Primary Examiner*—Robert L. Richardson
*Attorney, Agent, or Firm*—Mueller, Aichele & Gillman

[57] ABSTRACT

A color television receiver is provided with the customary manual controls for permitting a viewer to adjust brightness, contrast, saturation and hue of the image reproduced by the receiver. In addition, preset controls for brightness, contrast, hue and saturation are provided, and a push-button switch is used to select either the manual or preset controls to establish the characteristics of the reproduced image. With the push-button switch set to select the automatic or preset controls, an AND gate is enabled to cause a shift in the color demodulator angles and further to cause the relative gains of the final output amplifiers to be changed to anhance colors in the range of skin tones reproduced by the receiver.

5 Claims, 3 Drawing Figures

PATENTED MAY 21 1974

3,812,524

SHEET 2 OF 2

PRESET CONTROL SYSTEM FOR A COLOR TELEVISION RECEIVER

This is a division of application Ser. No. 140,489, filed May 5, 1971, now abandoned.

BACKGROUND OF THE INVENTION

The NTSC color television system presently employed in the United States utilizes a composite television signal including luminance and chrominance signal components. The luminance components include contrast and brightness information, and the chrominance components are transmitted on a suppressed subcarrier wave which is phase-modulated to represent hue and is amplitude-modulated to represent saturation of the color components of the composite signal.

In addition to the luminance and chrominance components of the composite signal, there are included horizontal and vertical synchronizing signal components and a color synchronizing burst component transmitted at the end of each line of video information. The color synchronizing burst component includes a number of cycles of a signal at the frequency of the subcarrier wave and is selected to have a standard phase relationship with respect to the phase of the modulated subcarrier wave. Thus, by phase and frequency synchronizing a reference oscillator in a television receiver to the burst component, accurate reproduction of the transmitted hue of the color image theoretically should be effected. In addition, the color synchronizing burst component theoretically has an amplitude bearing a predetermined relationship to the amplitude of the modulated subcarrier, so that an automatic gain control system responsive to the burst amplitude theoretically may be used to cause the reproduction of the proper saturation of the transmitted color components by the receiver.

In actual practice, however, the burst component does not always have the theoretical predetermined phase relationship with the transmitted color signal nor does it have the theoretical predetermined amplitude relative to the transmitted color signals. As a consequence, in television receivers relying solely upon the burst component to establish the phase of the receiver subcarrier oscillator and to establish the gain of the chrominance amplifiers, reproduction of a color image of improper hue and improper saturation often results. The causes for variation of the burst component characteristics from the theoretical ideal may result from improper reinsertion of the synchronizing burst components into the transmitted signal at the transmitting station. Or variations at the transmitting station between live transmission, video tape sources, and movie films all cause hue and saturation variations relative to the reinserted burst components.

Because of these variations in hue and saturation and additional variations in brightness and contrast of the transmitted images received by a television receiver, it has been the practice in the past to provide color television receivers with manually adjustable controls for brightness, contrast, hue and saturation. Proper manipulation of all four of these controls, which necessarily are interrelated, is necessary to obtain a proper reproduction of a color television image. If an adjustment of these controls were necessary only occasionally, the controls might not be objectionable. Unfortunately this is not generally true, however. It often is necessary to readjust these controls when tuning from one station to another, or when a transmitting station changes from one source of material to another. It often becomes difficult for the average viewer to obtain a reproduced image which is faithful to the one which was transmitted. Even if a person is skilled at properly adjusting these four interrelated controls to obtain proper image reproduction, the frequent adjustment which must be made to maintain a proper color television image soon becomes annoying, with the result that adjustment of the controls is made far less frequently than it ought to be. Thus, much of the time the reproduced image is not as faithful to the transmitted signal as it could be.

An attempt has been made to eliminate the necessity for this frequent adjustment of the brightness, contrast, hue and saturation controls of a television receiver by providing an automatic hue control system which causes a shift of received signals in a region near the color axis representing the hue of flesh tones toward that axis, thereby distorting the hue of colors near the flesh tone axis. A system which causes a distortion of this type provides a relatively acceptable image, inasmuch as the viewer is unaware of the exact hues of the other colors which are being transmitted and is most acutely aware of variations in the hues of flesh tones which appear as shifts toward green or purple. Such an automatic hue control system, however, requires adjustment by the viewer and adds a relatively large number of additional components to the television receiver. Even so, such a prior art system does not compensate for variations in saturation relative to brightness and contrast.

Other attempts at effecting an automatic control for a color television receiver have been in the form of an automatic chroma control or ACC system, which is a gain control system responsive to the amplitude of the received color burst components of the composite signal. As described previously, however, the amplitude of the color burst components does not always bear a consistent relationship to the saturation or amplitude modulation of the information portion of the received composite signal. Thus, ACC control systems which are burst responsive do not always provide proper gain control for the saturation or intensity of the color components of the composite signal.

Other attempts have been made to cause the gain control or the chrominance components of the composite signal to be effected by a peak detecting circuit connected in a feedback loop in the chrominance amplifier section of the television receiver. This type of system theoretically should be superior to an ACC system responsive solely to the burst components of the composite signal, but has been found to be insufficient to provide proper saturation of the reproduced image. Apparently, this insufficiency is due to the fact that the saturation of the color components of the television signals are interrelated with contrast and brightness in the luminance channels, so that variations in the adjustment of the manually adjustable contrast and brightness controls has an affect on the saturation of the reproduced image. Thus, control of the saturation in the chrominance amplifier section of the receiver, without taking into account the variations caused by different settings of the contrast and brightness controls, is ineffective to provide proper automatic control of the saturation of the reproduced image.

Thus, it is desirable to provide simple and inexpensive automatic preset controls for a color television receiver which will cause the receiver to produce a pleasing color image when the receiver is switched from one channel to another and when the transmitting station switches from one transmitting media to another.

SUMMARY OF THE INVENTION

Accordingly, it is an object of this invention to provide an improved color television receiver.

It is another object of this invention to provide a preset color television receiver.

It is a further object of this invention to employ preset controls which are duplicates of the manual controls used in a color television receiver, with selection of either the preset or manual controls being effected by a two position switch.

It is yet another object of this invention to provide preset controls for contrast, brightness, and hue in a color television receiver, along with an automatic saturation control circuit responsive to the saturation of the received composite signal during the signal information portions of the received signal.

It is yet another object of this invention to provide preset controls for a color television receiver in which the background is automatically shifted slightly toward red and the angle of demodulation is increased when the receiver is placed in an automatic mode of operation.

In accordance with a preferred embodiment of this invention, a color television receiver is provided with manually adjustable controls for brightness, contrast, hue and saturation. These controls are of a type commonly found in color television receivers. All of these controls are connected to contacts engaged in a "manual" position of a push-button selector switch, having an "automatic" position which connects preset duplicate controls for brightness, contrast, and hue into the circuit. The duplicate controls are preset to a preestablished relationship with one another and with an automatic saturation control circuit which also is connected and rendered operative in place of the manually controlled saturation control for the receiver when the selector switch is placed in its automatic position. In addition, a gate is rendered effective to cause the angles of demodulation of the color demodulator to be changed and further to cause the relative drives of the video output amplifiers to be changed, shifting the background of the reproduced signals slightly toward red.

When the selector switch is placed in its manual position, the automatic controls are disconnected and the conventional manual controls once again are used to establish contrast, brightness, hue and saturation of the reproduced image. In the manual position the normal demodulation angles of the demodulator are reestablished, as are the normal relative drives of the red, green and blue output amplifiers connected to the cathode ray tube.

BRIEF DESCRIPTION OF THE DRAWING

FIGS. 1*a* and 1*b* comprise a circuit diagram, partially in block form, of a preferred embodiment of this invention; and FIG. 2 illustrates the manner in which FIGS. 1*a* and 1*b* are to be placed together to form the complete circuit diagram.

DETAILED DESCRIPTION

Figures 1A, 2:
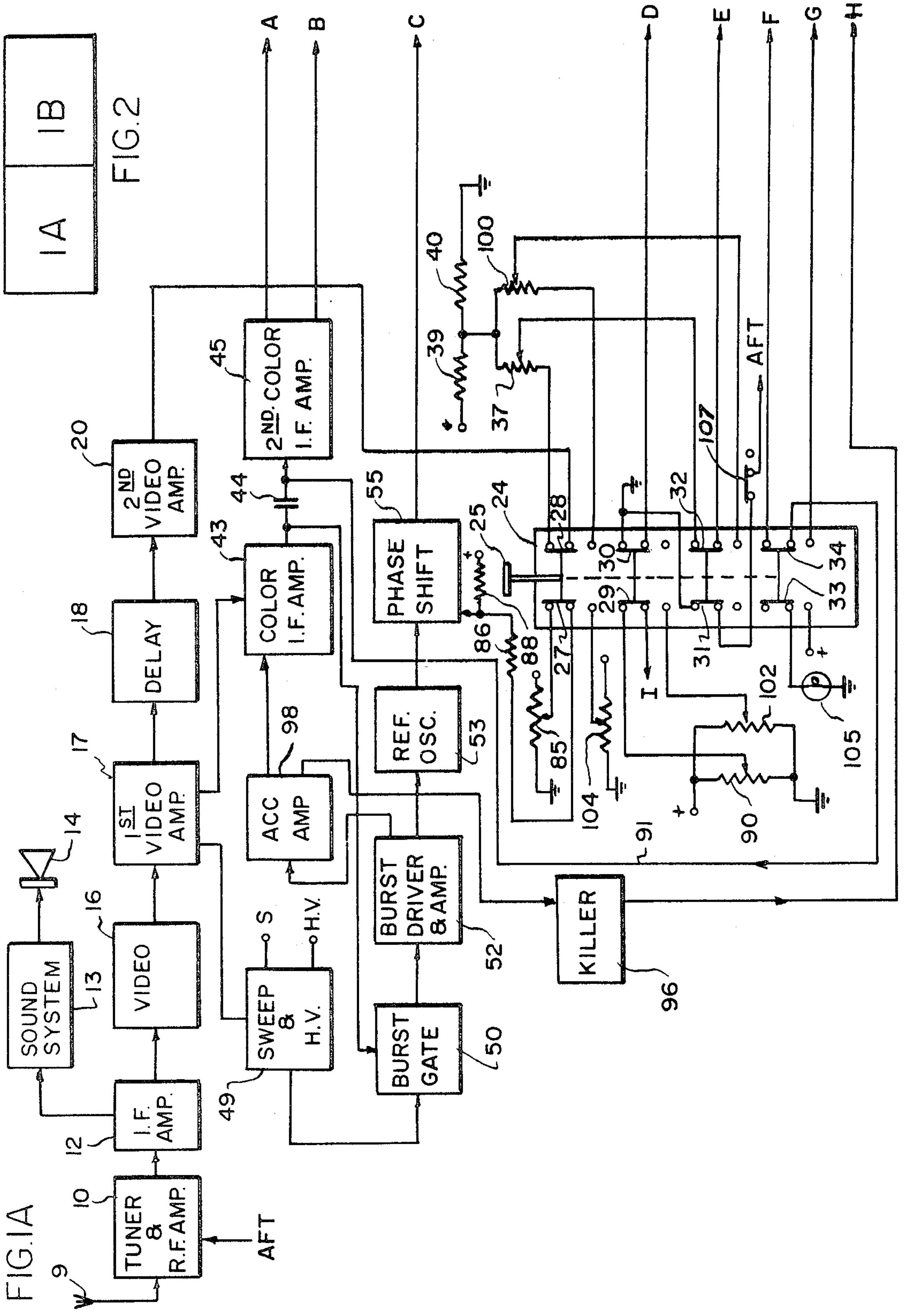
Figure 1B:
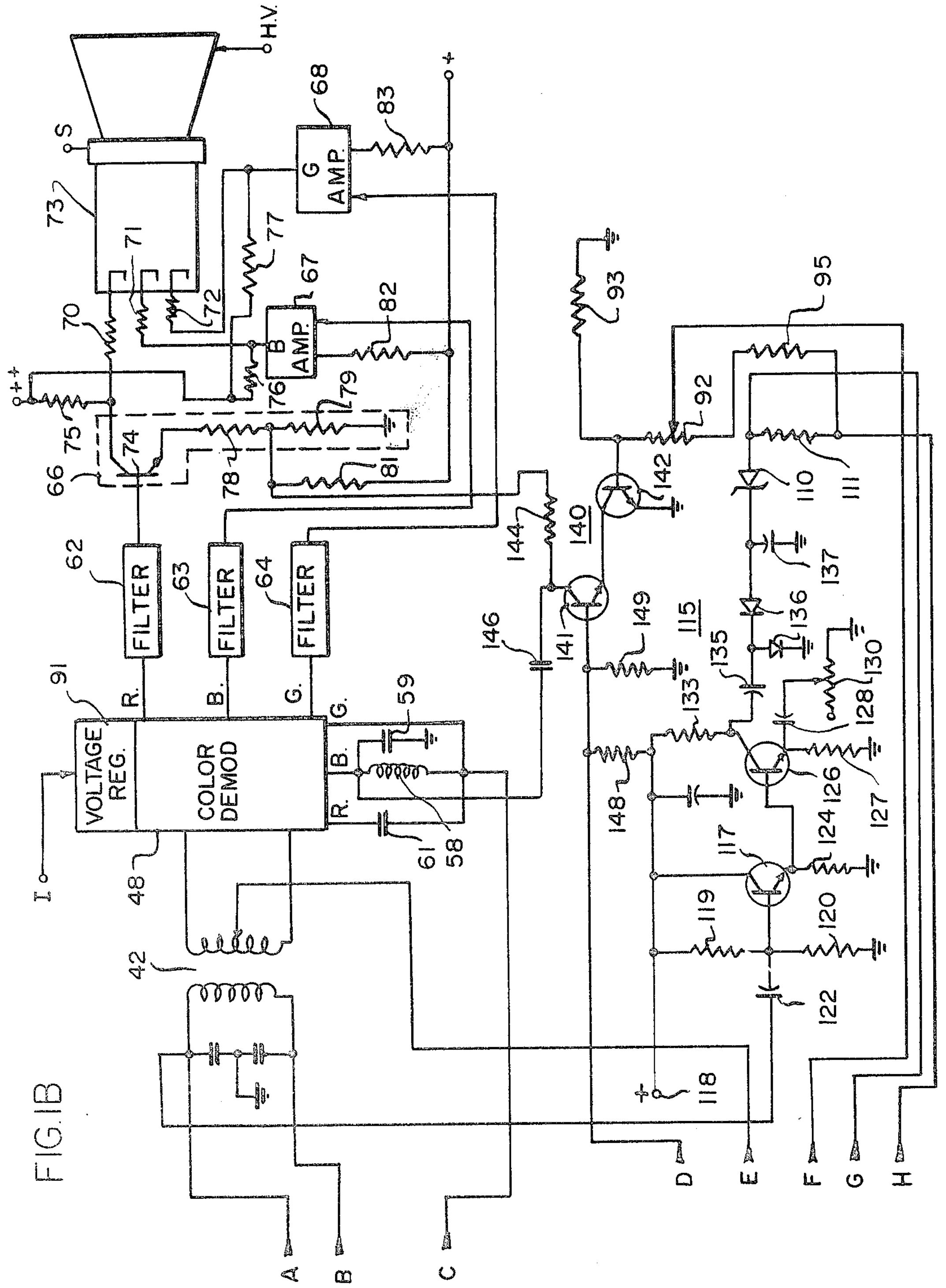

Referring now to the drawings, composite color television signals are received on an antenna 9 and are applied to a tuner and RF amplifier circuit 10 of a color television receiver. The circuit 10 includes the conventional tuner, RF amplifier, and mixer stages of the receiver and may be of conventional form and supplies intermediate frequency (IF) signals at its output. These IF signals are applied to the input of an IF amplifier stage 10 which may include several IF amplifiers. Output signals from the IF amplifier stage 12 are applied to a sound system 13 which drives a loudspeaker 14 to provide audio signals in a conventional manner.

The video components of the signals at the output of the IF amplifier stage 12 are applied to a conventional video detector circuit 16, and the detected signals are amplified by a first video amplifier circuit 17. The luminance or brightness signal components then are passed through a delay circuit 18, which is employed in a well known manner to add a delay to the luminance signal components equal to the delay encountered by the chrominance signal components in the color processing portions of the system, the delayed video signal components to a second video amplifier circuit 20, the output of which is connected to one of a plurality of inputs to a two position push-button selector switch circuit 24.

The switch circuit 24 is employed to permit operation of the color television receiver in either a manually adjustable mode of operation or in a preset automatic mode of operation. A push-button plunger 25 constitutes the actuating member of the switch circuit 24 and is shown in the drawing in its upper or manual position. Eight slide contacts, 27 to 34, are attached to the push-button plunger 25 for movement with it from the position shown in the drawing, with each of the movable contacts 27 to 34 bridging center and upper corresponding fixed contacts associated therewith, to a position where the movable contacts 27 to 34 bridge corresponding lower end center fixed contacts. Thus, with the switch plunger 25 in its upper or manual position, the movable contacts 27 through 34 serve to connect the center fixed contact associated with each of these movable contacts to the upper fixed contact associated therewith. When the switch plunger 25 is moved to its lower or automatic position, the center fixed contact for each of the movable contacts 27 through 34 is interconnected with the lower fixed contact associated with each of the movable contacts.

With the circuit in its manual mode of operation, the output of the second video amplifier 20 is connected through the movable contact 28 of the switch 24 to the lower end of a contrast control potentiometer 37, the upper end of which is connected to the junction between a pair of resistors 39 and 40, connected in series as a voltage divider between a source of positive potential (not shown) and ground. Thus, the adjustment of the movable tap of the potentiometer 37 may be effected to provide a manual contrast adjustment for the video luminance signal components at the output of the video amplifier 20. The tap of the potentiometer 37 is connected by the movable contact 32 of the switch 25 to an output conductor E—E connected to the center tap of the secondary winding of a transformer 42.

The chrominance signal components from the output of the first video amplifier circuit 17 are applied to a color IF amplifier 43 which supplies signals through a coupling capacitor 44 to a second color IF amplifier 45, the output of which is applied across the primary winding of the transformer 42. As a consequence, the two ends of the secondary winding of the transformer 42 have opposite phases of the chrominance signal appearing thereon, and the same phase of the luminance or brightness signal components, due to the fact that the luminance signal components are applied to the center tap of the secondary winding of the transformer 42. The composite luminance and chrominance signal components then are applied as input signals to the input of a color demodulator circuit 48, which preferably is a direct demodulator of the type shown in the patent to Cecchin/Hilbert U.S. Pat. No. 3,558,810.

In order to effect demodulation of the signals applied to the input of the color demodulator 48, the demodulator 48 must be supplied with a regenerated subcarrier signal. This is accomplished by applying the output of the first video amplifier circuit 17 to a sweep and high voltage system 49 which also operates to separate the burst components in a burst gate 50 by applying a gating pulse thereto during the horizontal retrace intervals. The signals at the output of the IF amplifier stage 43 also are applied to the input of the burst gate 50; and since the burst signal components occur during the horizontal retrace intervals of the composite signal, only the burst components are supplied through the burst gate 50 to a burst driver and amplifier circuit 52. The output of th amplifier circut 52 then is used to phase and frequency lock the operation of a reference oscillator 53.

The phase of the output of the reference oscillator 53 with respect to the received composite signal is controlled by applying the output of the oscillator 53 through a voltage-controlled phase shift circuit 55. Phase-shifted reference oscillator signals then are applied over the lead C—C to additional phase shifting or phase splitting circuits connected to the reference signals inputs of the color demodulator 48. Specifically, the output of the phase shift circuit 55 is applied directly to the green reference signal input of the demodulator 48; is applied through an inductor 58, coupled to ground through a capacitor 59, to the blue reference input of the color demodulator 48; and is applied through a capacitor 61 to the red reference input of the color demodulator 48. The inductor 58 and capacitors 59 and 61 operate to cause the phases of the reference signals applied to the red, blue, and green reference inputs of the demodulator 48 to be separated by conventional phase angles for demodulating the modulated signals applied to the signal inputs of the demodulator 48 from the secondary winding of the transformer 42.

Because the demodulator 48 is a direct demodulator, its outputs represent the red, blue, and green color information directly. These outputs are applied through conventional filters 62, 62 and 64, respectively, to the inputs of video output amplifiers 66, 67 and 68, which are connected through coupling resistors 70, 71 and 72 to the three cathodes of a conventional three-gun color cathode ray tube 70 for reproduction of the color television image on the screen thereof.

Only the red video drive amplifier 66 has been shown in detail, with the video drive amplifiers 67 and 68 being identical to the amplifier 66. Each of these amplifiers includes an NPN transistor, the collectors of which are connected to a source of B+ operating potential through collector load resistors 75, 76 and 77, respectively. The emitter of the transistor 74 is connected to ground through a pair of series-connected emitter resistors 78 and 79, and a similar connection is made in each of the other amplifiers 67 and 68. An emitter biasing potential is applied to each of the amplifier circuits 66, 67 and 68 to the junction of the emitter resistors 78 and 79 through input resistors 81, 82 and 83, respectively, to establish the emitter operating bias for the amplifiers 66, 67 and 68. With the push-button plunger 25 of the switch 24 in its upper or manual position, the movable contact 27 connects the adjustable tap of the manual hue control potentiometer 85 (FIG. 1*a*) through the movable contact 27 of the switch 24 to form part of a voltage divider between B+ and ground and including a pair of resistors 86 and 88. The junction between the resistors 86 and 88 forms the input for controlling the degree of phase shift of the phase shift circuit 55. By moving the tap of the potentiometer 85, the potential at the junction of the resistors 86 and 88 is varied to thereby effect a variation of the amount of phase shift imparted to the reference oscillator output by the phase shift circuit 55. This is a conventional manual hue control of the reproduced image.

With the switch circuit in the manual mode, as shown in the drawing, brightness control of the reproduced image is effected by a manual brightness control potentiometer 90 connected between a source of B+ (not shown) and ground. The movable tap of the potentiometer 90 is coupled by the movable contact 29 of the switch 24 to apply the potential appearing thereon over a lead I—I to a voltage regulator portion 91 of the demodulator circuit 48 to control the D.C. supply potential for the red, blue and green demodulator sections thereby controlling the brightness component of the signal supplied at the outputs of the color demodulator circuit 48.

The intensity or saturation of the chrominance signal components applied from the output of the second color IF amplifier 45 to the ends of the primary winding of the transformer 42 is controlled by controlling the DC bias or operating level of the input for the second color IF amplifier 45. With the switch 24 in its manual mode of operation, this DC bias level is applied through the movable contact 34 over the lead F—F connected to the movable tap of a manual saturation control potentiometer 92, one end of which is connected through a resistor 93 to ground and the other end of which is connected through a resistor 95 over a lead H—H to the output of a color killer circuit 96.

The color killer circuit 96 operates to provide a positive DC operating potential of a predetermined magnitude when color signals are being received by the television receiver and operates to couple a near ground potential to its output when no color signals or very weak color signals are being received by the television receiver. Thus, at any time that the output of the color killer circuit 96 is low or near ground potential, the potential on the tap of the potentiometer 96 also is near ground potential and provides insufficient forward bias to operate the second color IF amplifier 45, thereby rendering that amplifier nonconductive or nonresponsive to signals applied to its input. This causes the chrominance processing channel to be effectively "killed" during reception of black and white or weak color signals in a manner which is well known.

To operate the color killer circuit 96, an ACC amplifier circuit 98 is provided with input signals from the output of the burst driver and amplifier circuit 52 and produces an output to the color killer circuit 96 which is representative of the amplitude of the burst signal components present at the output of the circuit 52. The output of the ACC amplifier circuit 98 also is applied to the input of the first color IF amplifier 43 to control the gain of the amplifier 43, so that it can be seen that the ACC amplifier circuit 98 is connected in a feedback loop from the output of the color IF amplifier stage 43 by means of the burst gate 50 and the burst driver and amplifier circuit 52. As the amplitude of the burst signal components increases, the output signal provided by the ACC amplifier 98 to the color IF amplifier 43 is of such a magnitude as in such a direction to reduce the gain of the color IF amplifier stage 43 accordingly, and vice-versa. As a consequence the magnitude of the burst signal components appearing at the output of the IF amplifier stage 43 is maintained relatively constant by the feedback loop including the ACC amplifier 98.

In the circuit described thus far, the operation is conventional with independent manual adjustment of the potentiometers 37, 90, 85 and 92 being utilized to effect control of the contrast, brightness, hue and saturation of the reproduced image in a conventional manner. The operation of the circuit in this manual mode, however, is subject to all of the disadvantages inherent in any color television receiver employing independent manual adjustment of all of these controls.

To provide automatic compensation for variations in hue and saturation of the received signal relative to selected contrast and brightness settings of the television receiver, the switch 24 is provided with an automatic position which is selected by depressing the push-button 25 to its lower position, causing the movable contacts 27 and 34 to bridge the center and lower fixed contacts associated with each of the movable contacts. When this is done, the movable contact 28 disconnects the manually adjustable contrast potentiometer 37 from the circuit and connects a preset contrast potentiometer 100 into the circuit in the place of the potentiometer 37. The preset value of the contrast potentiometer 100 is selected to be at a point which permits tracking of an automatic saturation control circuit with the luminance signal components.

Similarly, movement of the movable contact 29 of the selector switch 24 to its lowermost position disconnects the manual brightness control potentiometer 90 from the circuit and substitutes for it a preset brightness control potentiometer 102, which is connected in parallel with the potentiometer 90. Thus, the control of the brightness of the circuit is established by the setting of the tap of the potentiometer 102 which establishes the supply potential applied over the lead I—I to the voltage regulator portion 91 of the color demodulator circuit 48.

Similarly, movement of the movable contact 27 to its lowermost position disconnects the hue control potentiometer 85 from the circuit and connects in its place, a preset hue control potentiometer 104 to thereby control the phase shift imparted to the reference oscillator signal 53 by the phase shift circuit 55. It should be noted that the potentiometers 100, 102 and 104 each are connected in parallel with the corresponding manually adjustable potentiometers 37, 85 and 90, with selection of the particular set of potentiometers being effected in accordance with whether the switch 24 has the plunger 25 in its upper or manual position or in its lower or automatic position.

To provide the user of the television receiver with a visual indication of the mode of operation to which the switch 24 has been set, a lamp 105 is connected between ground and the fixed center contact associated with the movable contact 33 of the switch 24. When the movable contact 33 is in its lowermost position, it couples the other end of the lamp 105 to a source of positive potential (not shown). This causes the lamp 105 to be illuminated when the switch is in its automatic position. With the switch in the manual position shown in the drawing, the lamp 105 is disconnected from the source of B+ operating potential.

It is preferable in a television receiver of the type shown in the drawings to employ an automatic fine tuning circuit of a conventional type. When the receiver is operated in its manual mode of operation, it further is desirable to control the interconnection of the automatic fine tuning (AFT) circuit with the remainder of the television receiver at the will of the viewer. As a consequence an automatic fine tuning on/off switch 107 is provided, and it is shown in the OFF position for operation of the receiver in its manual control mode. In this position, the AFT output of the switch 107 is connected through the movable contact 31 to ground over the path shown in the drawing. A ground connection disables the AFT circuit. With the switch 24 operated to its automatic mode of operation, however, the connection to ground is broken by the movable contact 31, and the open circuit condition corresponds to AFT ON. Thus, in the automatic mode of operation the automatic fine tuning circuit always is rendered effective irrespective of the setting of the switch 107.

With the movable contact 34 in its lower position for the automatic mode of operation of the television receiver, the connection over lead F—F to the tap of the saturation control potentiometer 92 is broken, so that the manual saturation control is disabled. A connection is completed from the input of the second color IF amplifier 45 over the lead 91 through the lower fixed contact associated with the movable contact 34 and over the lead G—G to the junction of a zener diode 110 and a resistor 111, with the DC voltage level appearing at this junction then constituting the saturation control potential used to control the gain of the second color IF amplifier 45. The output of the color killer circuit 96 is applied to the other end of the resistor 111, with the potential appearing at the junction of the zener diode 110 and the resistor 111 varying in accordance with the potential applied to the cathode of the zener diode 110 by an automatic saturation control circuit 115.

The control circuit 115 includes a first NPN emitter-follower transistor 117, the collector of which is supplied with B+ potential applied to an input terminal 118 from a source of positive supply voltage (not shown), and the base of the transistor 117 is supplied with a DC bias potential from a voltage divider comprising a pair of resistors 119 and 120 connected between the terminal 118 and ground. Input signals for the emitter-follower transistor 117 are applied through a coupling capacitor 122 to the base of the transistor 117 and are derived from the signals appearing on the lead A—A at the output of the second color IF amplifier 45. Thus, these input signals have an amplitude which is representative of the amplitude of the chrominance signal components which are applied from the output of the second color IF amplifier stage 42 to the color demodulator 48 through the transformer 42. These signals appear across the emitter resistor 124 of the emitter-follower transistor 117 and are applied to the base of a second NPN transistor 126, the emitter of which is connected to ground through an emitter resistor 127 and which also is coupled through a capacitor 128 to the tap of a saturation control potentiometer 130, one end of which is connected to ground. The capacitor 128 operates as a DC blocking capacitor while permitting adjustment of the potentiometer 130 to control the attenuation of the AC chrominance signal components appearing on the emitter of the transistor 126.

The collector of the transistor 126 is coupled through a collector load resistor 133 to the terminal 118, and the signals appearing on the collector are coupled through a coupling capacitor 135 to a rectifier circuit, including a pair of diodes 136, to store a charge on a storage capacitor 137. This charge is representative of the average value of the peak excursions of the chrominance signal components applied to the base of the transistor 117. The time constants of the discharge circuit for the capacitor 137 are selected to be long enough to cause the charge stored by the capacitor 137 to be relatively slowly varying, while permitting the charge to follow variations in peak amplitude of the chrominance signal components appearing at the output of the second color IF amplifier 45. In a commercial application of the circuit the capacitor 137 had a value of 10 microfarads.

The DC charge stored by the capacitor 137 is coupled by the zener diode 110 to the junction of the anode of the zener diode 110 and the resistor 111 and is applied over the lead G—G to the input of the second color IF amplifier 45 to vary the DC bias or drive level for that amplifier thereby controlling its gain in accordance with the charge stored on the capacitor 137. This gain control of the amplifier 45 is dependent solely on the variations of chrominance components and is not dependent on variations of the luminance signals. The zener diode 110 transfers the DC level at the output of the circut 115 to the input of the amplifier 45 without losing any Δ change of DC, thereby maintaining high loop gain. If a particular application of the saturation control circuit does not require a transfer of the full Δ DC change, the zener diode 110 could be replaced with a resistor.

The capacitor 44 isolates the DC level appearing on the lead 91 from the DC level of the signal appearing at the output of the color IF amplifier stage 43, so that burst responsive ACC control loop, including the output of the color IF amplifier 43 the burst gate 50, burst driver amplifier 52, and ACC amplifier 98, is isolated from the saturation control loop which includes the automatic saturation control circuit 115. This latter saturation control circuit operates only on the second color IF amplifier stage 45, so that two independent gain control loops are present in the circuit. Thus, the conventional ACC circuit, which is responsive to the amplitude of the burst signal components maintains the amplitude of the burst components at a constant level independently of automatic saturation control to prevent clipping of the burst components which would result in undesirable affects on the operation of the receiver.

Since the level of the chrominance signal components during the information portions of the received television signal may vary substantially with respect to burst, as described previously, and in fact may be equal to or greater than the magnitude of the burst components, the automatic saturation control circuit 115 operates to maintain a predetermined constant relationship of the saturation of the chrominance signals with respect to the contrast of the luminance components established by the preset contrast potentiometer 100. The setting of the preset contrast potentiometer 100 is adjusted relative to the setting of the preset saturation control potentiometer 130 in the circuit 115 to a point at which the chrominance and luminance information track one another. It has been found that with this relationship of the settings of the potentiometers 100 and 130, the most pleasing image reproduction is achieved by the cathode ray tube 73.

In order further to enhance the quality of flesh tone reproduction in the image displayed on the screen of the cathode ray tube 73 when the receiver is being operated in its automatic mode of operation, the background is automatically shifted slightly toward red and the angle of the modulation is slightly increased. This is accomplished by means of an AND gate 140 including a pair of NPN transistors 141 and 142, the collector-emitter paths of which are connected in series between ground and the junction of a resistor 144 with a capacitor 146. The capacitor 146 connects the collector of the transistor 141 to the junction of the inductor 58 and the capacitor 59 at the input for the blue reference signal applied to the color demodulator 48. When the receiver is being operated in its manual mode of operation, the movable switch contact 30 connects ground potential over the lead D—D to the base of the transistor 141, biasing the transistor 141 nonconductive, so that it acts as an open circuit and the capacitor 146 and resistor 144 have no affect on the operation of the television receiver circuit.

When color signals are being received, the output of the color killer circuit 96 is relatively positive, as described previously; so that the potential of the junction of the potentiometer 92 with the resistor 93 is positive potential relative to ground. The transistor 142 then is biased into conduction, thereby enabling the AND gate 140 for operation. When the movable contact 30 is moved to its lower position for the automatic mode of operation of the television receiver, the connection to ground on the lead D—D is broken and replaced with an open circuit. This then permits the positive potential applied to the terminal 118 to be applied to the base of the transistor 41 through a voltage divider including a pair of series-connected transistors 148 and 149 coupled between the terminal 118 and ground. The junction of these resistors is connected to the base of the transistor 141, and the potential at this junction rises to a level sufficient to forward bias the transistor 141 into conduction.

Since the transistor 142 also is conductive during the reception of color television signals, the potential at the junction of the capacitor 146 and the resistor 144 drops to near ground potential. This effectively causes the capacitor 146 to be connected in parallel with the capacitor 59 to alter the phase angle of the injection voltage to the blue reference input of the color demodulator 48, causing the angle of demodulation of the blue section of the color demodulator 48 to be shifted slightly away from red.

At the same time, the near ground potential applied to the resistor 144 also is coupled by the resistor 144 to the junction of the resistors 78 and 79 in the emitter circuit of the transistor 74 in the red driver amplifier 66. This causes the emitter biasing potential on the transistor 74 to be lowered relative to the biasing potentials applied to the emitters of the transistors in the blue and green driver amplifier circuits 67 and 68. Since the transistor 74 is an NPN transistor, the lowering of the potential on the emitter of this transistor toward ground causes the transistor 74 to be rendered more heavily condutive. This in turn lowers the potential applied to the cathode of the red gun in the cathode ray tube 73, thereby increasing the drive of the red gun relative to the blue and green guns; so that the background of the reproduced image in the cathode ray tube 73 is shifted slightly toward red.

If reception of the television receiver should then shift to a black and white signal, or if the level of reception of a color signal becomes too low to result in satisfactory reproduction of a color image, the output of the color killer circuit 97 reflects this change and drops to near ground potential. This then causes the potential on the base of the transistor 142 to drop to near ground rendering the transistor 142 nonconductive, opening the circuits controlled by the AND gate 140. As a consequence, the normal demodulation angles of the color demodulator 48 are restored and the driver amplifier circut 66 reverts to its normal level relative to the driver amplifiers 67 and 68, removing the red shift.

As stated previously, when the switch push-button plunger 25 is raised to its manual position, the AND gate 140 is opened, causing the normal demodulation angle and the normal relative drives of the amplifiers 66, 67 and 68 to be reestablished.

By using preestablishing fixed automatic settings of the brightness control potentiometer 102 and the contrast potentiometer 100 with respect to the setting of the automatic saturation control potentiometer 130, tracking of the luminance signal components with color saturation is effected to result in tracking of the color saturation or intensity with variations in luminance signal components. The use of the ACC control loop compensates for minor changes in the overall color signal level dependent upon the color synchronizing level of the burst signal components. Small color signal level changes, or variations of saturation with the amplitude or level of the burst components remaining constant, as when a camera level is high or low, are automatically adjusted by the automatic saturation control circuit 115. The preestablished setting of the hue control potentiometer 104 and the shift of the demodulation angles and the shifting toward red of the background in the CRT operates in conjunction with the other portions of the circuit in the automatic mode of operation to correct for varying flesh tones in the reproduced image.

We claim:

1. In a color television receiver responsive to a composite signal including luminance signal components, color synchronizing burst components, and a subcarrier signal phase-modulated to represent hue and amplitude-modulated to represent saturation, the receiver including luminance signal processing circuit means for providing an output signal representative of brightness and contrast of the composite signal, subcarrier signal processing circuit means including demodulator circuit means supplying output signals representative of at least hue and saturation of the composite signal at different demodulation angles, and circuit means for applying the output signals of the luminance signal processing circuit means and the subcarrier signal processing circuit means to a cathode ray tube for producing a color television image, a reception control system including in combination:

preset control means coupled with said subcarrier signal processing circuit means and said luminance signal processing circuit means for establishing a predetermined relationship of brightness, contrast, and hue for the signal components processed by said respective circuit means;

peak responsive control circuit means coupled with said subcarrier signal processing circuit means for producing a gain control signal which varies in amplitude in accordance with variations in the peak amplitude of said subcarrier signal;

means coupled with said peak responsive control circuit means for coupling said gain control signal with said subcarrier signal processing circuit means for controlling the gain thereof inversely with variations in the peak amplitude of said subcarrier signal;

means coupled to receive said color synchronizing burst component and responsive to the amplitude thereof for enabling said peak responsive control circuit means for operation only with the amplitude of said burst component exceeding a predetermined value; and control means coupled with said burst responsive means and responsive thereto for controlling the demodulation angles of operation of said demodulator, changing said demodulation angles from a first predetermined relationship with the amplitude of said color synchronizing burst component exceeding said predetermined value to different demodulation angles with the amplitude of said color synchronizing burst component being less than said predetermined value.

2. The combination according to claim 1 wherein said demodulator circuit means supplies at least two color representative signals at first and second outputs thereof and said circuit means for applying output signals to said cathode ray tube includes first and second amplifier means coupled to the first and second outputs respectively, of said demodulator means for amplifying and applying said color representative signals to said cathode ray tube; and further including circuit means coupled with said control means and responsive thereto for causing the relative gains of said output amplifiers to be a first predetermined relationship with the amplitude of said burst component exceeding said predetermined value and to be of a second predetermined relationship with the amplitude of said burst component falling below said predetermined value.

3. In a television receiver responsive to a composite signal including at least color synchronizing burst components and a subcarrier signal phase modulated to represent hue and amplitude modulated to represent saturation, the receiver including a cathode ray tube for reproducing images, a color demodulator supplied with said modulated subcarrier signal and having color representative outputs, output amplifiers coupling each of the color representative outputs of the demodulator to the cathode ray tube, and a reference oscillator synchronized by the burst components for supplying a reference signal to the demodulator at the subcarrier frequency to control the operation of the demodulator in the demodulation of the subcarrier signal at different demodulation angles, a reception control system including in combination:

phase shifting circuit means for shifting the relative phases of said subcarrier signal and said reference signal supplied to the demodulator circuit means in response to a control potential for varying the amount of said phase shift in accordance with the magnitude of said control potential;

first manually adjustable circuit means for providing a variable control potential for said phase shifting circuit means;

additional circuit means for providing a predetermined control potential for said phase shifting circuit means;

switch means having at least first and second conditions of operation and coupled with said manually adjustable circuit means and said additional circuit means for interconnecting only said manually adjustable circuit means with said phase shifting circuit means in said first condition of operation and for interconnecting only said additional circuit means with said phase shifting circuit means in said second condition of operation;

means coupled to receive at least said burst components and responsive thereto for producing an enabling signal upon receipt of such components;

AND gate means coupled with said switch means and coupled to receive said enabling signal, said AND gate means responsive to said first condition of operation of said switch means to provide a first predetermined output and responsive simultaneously to said second condition of operation of said switch means and said enabling signal to provide a second predetermined output; and further circuit means coupled with said AND gate means and responsive to said outputs thereof for causing the relative gains of said output amplifiers to be in a first predetermined relationship with said AND gate means providing said first predetermined output and to be in a second different predetermined relationship with said AND gate means providing said second predetermined output.

4. The combination according to claim 3 further including demodulation angle control means coupled with said AND gate means and responsive to said outputs thereof for causing the demodulation angle of said demodulator to be in a first predetermined relationship with said AND gate means providing said first predetermined output and to be in a second predetermined relationship with said AND gate means providing said second predetermined output.

5. The combination according to claim 4 wherein said switch means comprises a two-position multiple contact pushbutton switch, one position of which corresponds to said first condition of operation and the other position of which corresponds to said second condition of operation, so that in said one position, one contact of said switch couples said manually adjustable circuit means with said phase shifting circuit means, and in said other position said one contact couples said additional circuit means with said phase shifting circuit means; and a second contact of said switch is connected with said AND gate means to establish the output thereof in accordance with the position of operation of said switch and the presence or absence of said enabling signal.

* * * * *